Aug. 5, 1952          K. M. SNIDER          2,605,784
CHECK VALVE
Filed Dec. 17, 1948
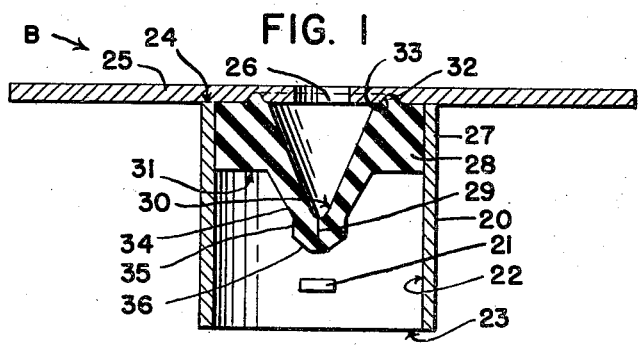
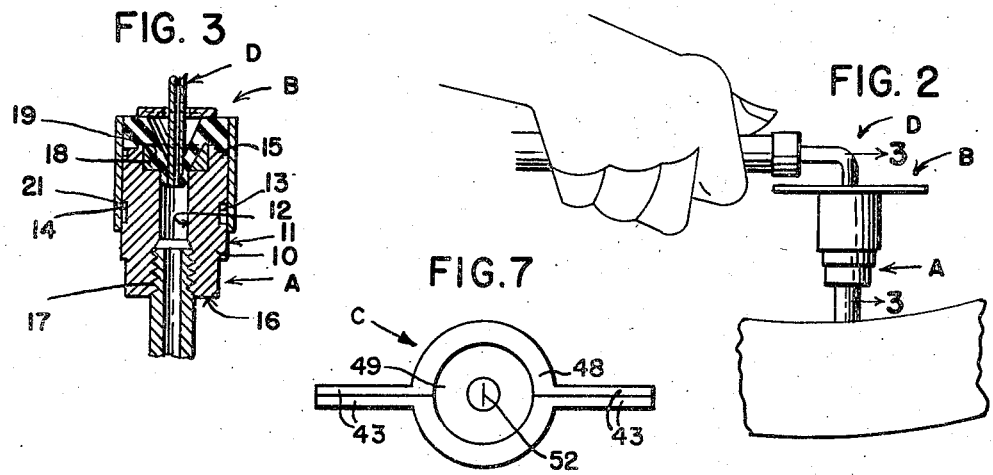
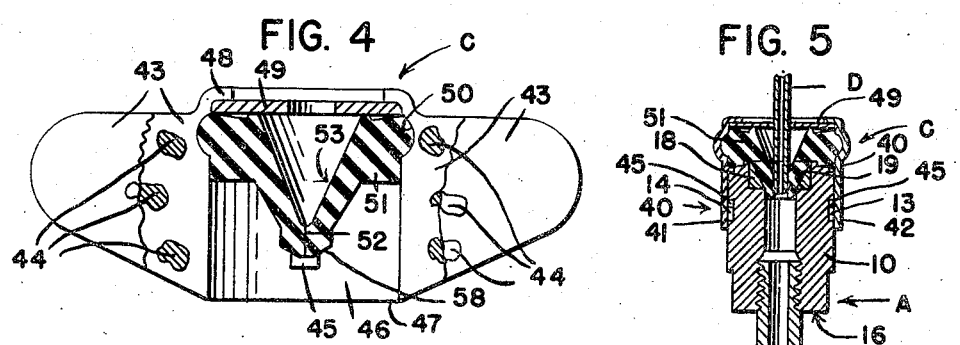
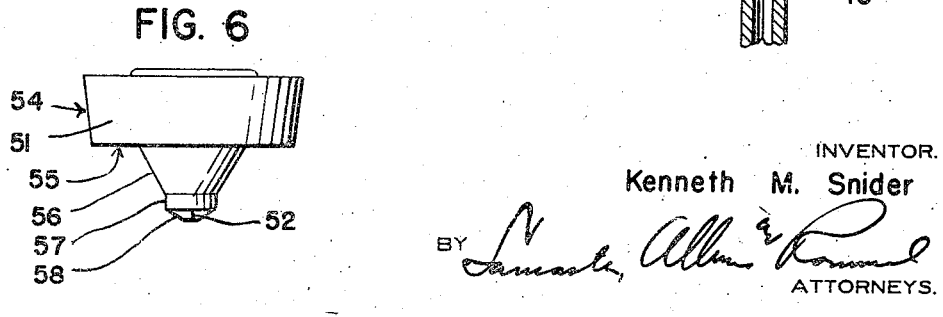
INVENTOR.
Kenneth M. Snider
BY
ATTORNEYS.

Patented Aug. 5, 1952

2,605,784

UNITED STATES PATENT OFFICE 2,605,784

CHECK VALVE

Kenneth M. Snider, Mansfield, Ohio

Application December 17, 1948, Serial No. 65,830

10 Claims. (Cl. 137—525)

This invention relates to valves and more particularly to check valves.

The application is a continuation-in-part of copending application Serial No. 747,096, dated May 9, 1947, for High Pressure Units, which has matured in Patent No. 2,529,621, of November 14, 1950.

An important object of the invention is to provide a check valve, including an inserted resilient member which is retained in place, in part, by means which has an added function.

Another important object is to provide a check valve including an inserted resilient member which is so disposed that leakage between the member and the housing therefor is substantially prevented.

A further important object is to provide such a valve, in association with a support for the valve housing, whereby the resilient member, when the valve is open, contacts a wall of the support and the extent of opening is thereby limited.

Other objects and advantages of the invention will be apparent during the course of the following detailed description of the invention, taken in connection with the accompanying drawing, forming a part of this disclosure, and in which drawing:

Fig. 1 is a vertical section of one embodiment of the new valve.

Fig. 2 is an elevation thereof, with the valve in use.

Fig. 3 is a vertical section, substantially on the line 3—3 of Fig. 2.

Fig. 4 is a vertical section of another embodiment of the new valve.

Fig. 5 is a vertical section thereof, with the valve open.

Fig. 6 is an elevation of a resilient insert for the valve of Figs. 4 and 5.

Fig. 7 is a top plan, on a reduced scale, of the valve of Fig. 4.

In the drawing, wherein for the purpose of illustration are shown preferred and modified forms of the invention and wherein similar reference characters designate corresponding parts throughout the several views the letter A designates a support for either of the two valve structures B or C and the letter D a nozzle, as a gooseneck nozzle.

The valve structures B and C are adapted for detachable mounting upon the support A which latter is, preferably, one of the coupling parts described in the copending application referred to above. The support includes a body portion 10 having a cylindrical outer surface 11 and a longitudinal bore 12, with a pair of spiral grooves 13 and 14, each forming a helix extending to the surface 11 from the forward end face 15 and falling short of the opposite or rear end face 16, whereby they extend longitudinally of the body portion 10. The outer ends of the grooves are spaced 180° apart and, of course, the inner ends thereof are also. Means 17 may be provided for mounting the support A upon any suitable structure having a passageway communicating with the bore 12. The bore 12 is enlarged circumferentially from the forward end face 15 inwardly towards the end face 16, so that a shoulder is provided and the enlarged bore and shoulder snugly accommodates an insert portion 18 having a beveled bore 19 communicating with the bore 12.

The new valve structure B comprises a housing structure including a cylindrical housing 20 provided with a pair of lugs 21 extending from the inner surface 22 of the housing 20, radially toward the axial center of the housing, being preferably disposed adjacent its lower end 23. Secured, as by welding, upon the upper end edge 24 of the housing 20 is an elongated plate or member 25 of metal or the like, having a circular aperture or perforation 26 with its axis aligned with the longitudinal axis of the housing 20, and forming part of the housing structure. Within the upper portion 27 of the housing 20 is a valve member 28 preferably of resilient material as rubber having a normally closed valve opening 29 at its lower or depending end portion, said valve opening being a slit. The valve member 28 is an insert and is provided with a conical seat 30 adapted to receive the free open end of the gooseneck nozzle D with the apex of the cone pointing toward the intersection of the axis of the lugs 21 and the longitudinal axis of the housing 20. The valve member 28 may be held frictionally within the housing 20 and is prevented from blowing upwardly and outwardly from the housing 20, as by air pressure below the member 28, by the overhanging portions of the plate 25 as is apparent in Fig. 1. Movement of the valve member in the other direction, as by air pressure issuing from the nozzle D, is prevented, as is apparent in Fig. 3 due to the forward end face 15 of the coupling part A since the valve structure B is adapted to be mounted upon the coupling part A, by causing the lugs 21 to ride along the two spiral grooves 13 and 14 of the coupling part A whereupon the substantially flat lower or abutment face 31 of the valve member 28 will come to rest upon the forward end face 15 of this coupling part.

Extending upwardly from the upper end of the valve member 28 is a bead 32 extending into a circular groove 33 in the plate 25 in order to insure a good connection and fluid-tight seal.

The depending lower or slitted end portion of the valve member 28 is of special contour with the outer face 34 sloping downwardly and inwardly to meet a short, substantially vertical outer face 35 which, in turn, joins a beveled outer face 36 of the valve member.

Referring now to the modified form of the invention, shown in Figs. 4, 5 and 6, the valve structure C differs from the valve structure B in having a housing structure including a cylindrical housing 40 made up of two semi-cylindrical body portions 41 and 42 with pairs of wing portions 43 extending outwardly from each body portion 41 and 42 and the several portions united, as by welding them together at the wing portions, such as shown at 44 in Fig. 4. Each body portion 41 and 42 has a lug 45 extending from the inner surface 46 of each body portion radially toward the axial center of the housing, being preferably disposed adjacent the lower end 47, and these function exactly like the lugs 21 of the form A. The upper end of the housing 40 has an inwardly extending annular flange member 48 confining a perforated disc member 49 within the housing 40 and the flange and disc members function as does the plate or member 25 of the form A, being part of the housing structure. It is preferred to attach the disc member to the flange member as by welding.

There is provided a circular groove or recess 50, in the housing 40 of the housing structure, adjacent its upper end, just below the disc member 49 to accommodate portions of the valve member 51 next to be described and functioning as does the groove or recess 33 of the form A.

The valve member 51 is preferably of rubber or like resilient material, having a normally closed valve opening 52, like the valve opening 29, and a conical seat 53 like the seat 30 and for the same purpose.

It will be noted that the outer major face 54 of the valve member 51 is beveled and this may be a characteristic of the outer major face of both valve members but, in the case of the valve member 51 this permits a portion of the latter, after being inserted in the housing 40 as in Fig. 4, to bulge into the groove 50 and form a seal against escape of fluid between the housing 40 and valve member 51.

The valve member has a substantially flat outer lower or abutment face 55 and on its depending portion, a sloping outer face 56, substantially vertical outer face 57 and beveled outer face 58, substantially like the faces 31, 34, 35 and 36 respectively of the form A.

The lugs 21 and 45 function not only as described, but they also aid in preventing the valve members 28 and 51 from being accidently separated from their respective housings, since they provide abutments adapted to engage the faces 31 and 55, as the case may be.

Of course, the valve structure C is coupled to the support A in exactly the same manner as is the structure B and when the nozzle D is inserted, as in Figs. 3 or 5, the valve is open. When open, the specific structure, embodied in the several faces 34, 35 and 36 of form B and faces 56, 57 and 58 of form C is such that the faces intimately engage (or pack against) the beveled face 19 of the insert 18 and the adjacent face of the bore 12 of the housing 10 and prevent the fluid (which is generally under some pressure) issuing from the nozzle D, from escaping between the walls of the insert and the valve member 28 or 51 as the case may be.

In addition, it should be noted that the faces 31 and 55, respectively, rest upon the end face 15 of the support A and tend to seal off escape of fluid both when the valves are open or closed.

Various changes may be made to the forms of the invention herein shown and described without departing from the spirit of the invention or scope of the claims.

What is claimed is:

1. In a valve structure for association with a coupling part including a cylindrical body having a face at one end and a helical groove extending into said body from said face to short of the other end of said body, said valve structure including a cylindrical valve housing having a perforated plate over one end thereof and a lug projecting into the hollow within said valve housing toward the longitudinal axis thereof and spaced from the opposite end of said valve housing, said lug being constructed and arranged to slide along said groove, and a valve member insert within said housing, including a conical portion of rubber with its apex pointing toward the intersection of the axis of said lug and said longitudinal axis, said apex being provided with a normally-closed slit, said valve member having an outwardly-extending face at the base of said conical portion, abutting said plate and surrounding the perforation therein, said last-named face being constructed and arranged to abut said face of said coupling part when said lug is adjacent the inner end of said groove.

2. In a valve structure, a valve housing structure having a cylindrical inner face, a perforated plate extending over one end and being provided with an arcuate groove spaced outwardly of the perforation of said plate, said housing being provided with a lug projecting inwardly from said face toward the longitudinal axis of said face, and a valve member insert within said housing abutting said plate, said valve member insert comprising a cone-shaped portion of rubber, with its apex extending toward the intersection of the axis of said lug and said longitudinal axis, said cone-shaped portion being provided with a slit at said apex, and said insert having an arcuate bead disposed within said arcuate groove and in intimate contact with the wall of said arcuate groove.

3. In a valve structure, a valve housing structure having a cylindrical inner face, a flange extending inwardly from one end of said face, an annular groove in said face and a disc provided with a perforation and disposed below and in contact with said flange and above said groove, and a rubber valve member insert having a portion below said disc, in tight contact with a part of said inner face and a portion within said groove and in tight contact with the wall thereof, said valve member insert having a valve slit substantially axially aligned with said perforation.

4. In a valve structure, a valve housing structure comprising two complementary sections, each having an arcuate inner face, a horizontally-disposed flange extending from one end of said face, an arcuate groove in said face below said flange and a disc provided with an axially-disposed perforation and disposed below and in contact with said flanges and above said grooves; means fixedly securing said complementary sections together; and a rubber valve insert within said housing, having a valve slit, a portion below said disc in intimate contact with parts of said inner face and a portion within said grooves and in intimate contact with the walls thereof, said perforation and slit being axially aligned.

5. In a valve structure, a valve housing structure having a cylindrical inner face, a flange extending inwardly from one end of said face, an annular groove in said face and a perforated disc disposed below and in contact with said flange and above said groove, a support-attaching lug projecting radially inwardly toward the axial center of said housing from said inner face, and a rubber valve member insert having a portion below said disc and above said lug, in tight contact with a part of said inner face, a portion within said groove and in tight contact with the wall thereof, and a face facing said lug, said valve member insert having a valve slit.

6. In a valve structure, a valve housing structure comprising two complementary sections, each having an arcuate inner face, a horizontally-disposed flange extending from one end of said face, an arcuate groove in said face below said flange, a support-attaching lug projecting radially from said inner face, and a perforated disc disposed below and in contact with said flanges and above said grooves, said lug being disposed in the path of accidental travel of said valve insert toward said end mouth; means fixedly securing said complementary sections together; and a rubber valve insert within said housing, having a valve slit, a portion below said disc and above said lug, in intimate contact with parts of said inner face and a portion within said grooves and in intimate contact with the walls thereof.

7. In combination with a hollow support having a forward face, a cylindrical outer face, and a longitudinally-extending groove in the outer face and extending to said forward face; a valve structure including a valve housing having a cylindrical inner face engaging said outer face, and an open end, a valve member insert within said housing having a major outer face in intimate contact with said cylindrical inner face, an abutment face, facing said open end, and a cone-shaped portion of rubber within said housing, projecting from said abutment face, and provided with a normally-closed slit; and means slidable within said groove upon rotation of said valve structure upon said hollow support to detachably connect said valve structure to said hollow support with said forward face and abutment face in contact, and to limit sliding movement of said valve member insert toward said open end, when said valve structure is separated from said support, comprising a lug projecting toward the axial center of said housing from said cylindrical inner face and spaced from and facing said abutment face.

8. In combination with a hollow support having a forward face, a cylindrical outer face, and a longitudinally-extending groove in the outer face and extending to said forward face; a valve structure including a valve housing having a cylindrical inner face engaging said outer face, an end wall having an outer face, an inner face and an axial opening from its inner to its outer face and an open end opposite said end wall, a valve member insert within said housing having a major outer face in intimate contact with said cylindrical inner face, an abutment face, facing said open end, a face opposite said abutment face, in contact with said end wall, and a cone-shaped portion of rubber within said housing, projecting from said abutment face, and provided with a normally-closed slit; and means slidable within said groove upon rotation of said valve structure upon said hollow support to detachably connect said value structure to said hollow support with said forward face and abutment face in contact, and to limit sliding movement of said valve member insert toward said open end, when said valve structure is separated from said support, comprising a lug projecting toward the axial center of said housing from said cylindrical inner face and spaced from and facing said abutment face.

9. In combination with a hollow support having a forward face, a cylindrical outer face, and a longitudinally-extending groove in the outer face and extending to said forward face; a valve structure including a valve housing having a cylindrical inner face engaging said outer face, an end wall having an outer face, an inner face and an axial opening from its inner to its outer face, and an open end opposite said end wall, said housing also having a substantially circular recess extending inwardly from one of said inner faces, a valve member insert within said housing having a major outer face in intimate contact with said cylindrical inner face, an abutment face, facing said open end, a face opposite said abutment face, in contact with said end wall, and a cone-shaped portion of rubber within said housing, projecting from said abutment face, and provided with a normally-closed slit, a portion of said valve member insert being disposed in said recess; and means slidable within said groove upon rotation of said valve structure upon said hollow support to detachably connect said valve structure to said hollow support with said forward face and abutment face in contact, and to limit sliding movement of said valve member insert toward said open end, when said valve structure is separated from said support, comprising a lug projecting toward the axial center of said housing from said cylindrical inner face and spaced from and facing said abutment face.

10. In combination with a hollow support having a forward face, a cylindrical outer face, and a longitudinally-extending groove in the outer face and extending to said forward face; a valve structure including a valve housing having a cylindrical inner face engaging said outer face, an end wall having an outer face, an inner face and an axial opening from its inner to its outer face, and an open end opposite said end wall, said housing also having a substantially circular recess extending inwardly from one of said inner faces and remote from said open end, a valve member insert within said housing having a major outer face in intimate contact with said cylindrical inner face, an abutment face, facing said open end, a face opposite said abutment face, in contact with said end wall, and a cone-shaped portion of rubber within said housing, projecting from said abutment face, and provided with a normally-closed slit, a portion of said valve member insert being disposed in said recess; and means slidable within said groove upon rotation of said valve structure upon said hollow support to detachably connect said valve structure to said hollow support with said forward face and abutment face in contact, and to limit sliding movement of said valve member insert toward said open end, when said valve structure is separated from said support, comprising a lug projecting toward the axial center of said housing from said cylindrical inner face and spaced from and facing said abutment face, said recess being remote from said abutment face.

KENNETH M. SNIDER.

REFERENCES CITED

The following references are of record in the file of this patent:

UNITED STATES PATENTS

| Number | Name | Date |
|---|---|---|
| 657,007 | Richter | Aug. 28, 1900 |
| 783,610 | Chaplin | Feb. 28, 1905 |
| 996,588 | Kennedy | June 27, 1911 |
| 1,282,075 | Hand | Oct. 22, 1918 |
| 2,244,997 | Lepper | June 10, 1941 |

FOREIGN PATENTS

| Number | Country | Date |
|---|---|---|
| 540,823 | Germany | of 1931 |
| 591,502 | France | of 1925 |